United States Patent [19]
Vrooman

[11] 3,886,910
[45] June 3, 1975

[54] ROTARY, MULTI-CHAMBERED, INTERNAL COMBUSTION ENGINE

[76] Inventor: Richard Arnold Vrooman, 22628 87th West, Edmonds, Wash. 98020

[22] Filed: Oct. 12, 1973

[21] Appl. No.: 405,868

[52] U.S. Cl. ............... 123/8.45; 418/136; 418/148; 418/261
[51] Int. Cl. ........................................... F02b 55/14
[58] Field of Search ..................... 123/8.45; 418/261

[56] References Cited
UNITED STATES PATENTS
1,686,767  10/1928  Saxon ................................. 123/8.45

Primary Examiner—Clarence R. Gordon

[57] ABSTRACT

A rotary engine comprising a slotted rotor with multiple combustion chambers formed between any pair of sliding gas seal barriers on adjacent faces of the rotor. The gas seal barriers are trapped between contoured cam surfaces which force the required motion of the gas seal barriers through the slotted rotor. The combustable mixture trapped between the sliding gas seal barriers, the cam surface, and the rotor disk and hub surfaces is compressed or expanded as the cam surface varies its displacement. The ignited gasses expand and push against the gas seal barriers, which function as paddles, and produce output torque. The spent gas is exhausted through a duct in the fixed housing.

4 Claims, 8 Drawing Figures

INVENTOR
RICHARD A. VROOMAN

INVENTOR
RICHARD A. VROOMAN

INVENTOR
RICHARD A. VROOMAN

ROTARY, MULTI-CHAMBERED, INTERNAL COMBUSTION ENGINE

This invention relates to a multi-chambered rotary engine, in which a combustion chamber is formed between any two of a multiple number of gas seal barriers, a contoured cam surface, and adjacent faces of the rotor disk. Since the gas seal barriers slide through the rotor disk, two combustion chambers are formed back-to-back on opposite faces of the rotor disk. Consequently, two engines are contained enclosed in a single housing in a very compact configuration. The cam surface can be contoured to produce displacements that will result in a pre-determined compression ratio. It is an object of the invention to provide a simple mechanism to compress, ignite, expand, and exhaust the appropriate combustable mixture to produce useful shaft torque. A further object of the invention is to provide a mechanism of such configuration that multiple combustion chambers of small volume can be utilized for efficient combustion without increasing the weight and complexiety of the engine to the degree the piston engine penalizes the design requirements for any given horsepower range. It is an object of the invention to provide a mechanism simple to manufacture with the smooth, high power of the gas turbine and the low to high speed operational range of the piston engine.

The invention features a rotor containing multiple, reciprocating flat plates, hereto referred to as gas seal barriers, constrained in a cylindrical housing. A contoured cam machined in the inside surface of the housing end covers forces the gas seal barriers to translate along the rotor hub and through the rotor disk. A rotor disk provides mechanical separation of the gas seal barriers and forms a combustion chamber between any two adjacent gas seal barriers; the housing inner surface; and the contoured cam surface. Thus two combustion chambers are formed on opposite surfaces of the rotor disk between any two adjacent gas seal barriers. As the gas seal barriers translate through the rotor disk and along the rotor hub, the volume of one combustion chamber approaches a maximum while the opposite chamber approaches a minimum volume. The cam profile permits two maximum volumes and two minimum volumes on each rotor face per revolution, thus producing two complete four cycle Otto or Diesel thermodynamic processes per revolution. The pressure of the detonating combustable mixture pushes against the gas seal barriers functioning as paddles and forces the rotor to turn producing output torque.

Inventors have attempted for many years to develop the rotary engine into a practical design that can compete with the piston engine. And currently, with the air pollution crisis, greater effort is being expended to find alternates to the dirty piston engine. Nearly all of the prior art internal combustion engines, including piston and rotary designs, are versions of various air compressor designs that have been in use for many years. The piston, the turbine, the helical screw, and the radial vane compressor mechanisms have been used in internal combustion engine concepts. The radial vane compressor has recently received much attention because of the use of simple flat plates to achieve the mechanical compression and expansion of the combustable gasses necessary for engine operation. In other versions of the same concept, the flat plate vane was thickened and utilized as a piston in a massive gas carrying rotor to provide additional engine gas handling capacity and thus increase low speed RPM operation of the radial vane design. All these designs were attempts to improve the inherent deficiencies of the parent concept. Since the vanes are arranged radially and displace perpendicular to the rotational axis in a non-circular housing, the diameter of the machine had to greatly increase to increase engine capacity. The essence of the invention concept described in this document is to utilize a flat plate displacing parallel to the axis of rotation. A machine is thus created that features concentric rotor and housing with the positive displacement and pre-determined compression ratio of the piston design. Each rotor face is utilized to double the number of combustion chambers for each pair of flat plates compared to the radial vane design. The result is an engine cheap to manufacture, with only a few moving parts, and similar to the gas turbine in operating smoothness and high power capacity.

The air cooled version of the invention is shown without the fan and shroud and in addition; the intake and exhaust manifolds, fuel system, transmission, and other accessories are not illustrated to isolate the concept of the invention for greater clariety. The design and use of these items and alternate liquid cooling shall be in accord with present state-of-the-art technics.

The design features of this invention along with the variations of the design and concept are set forth in the following description. The features of the present invention which are believed to be novel are set forth and described in the appended claims. The drawings included in this description may be referred to by the index numbers included below.

Figure 1:
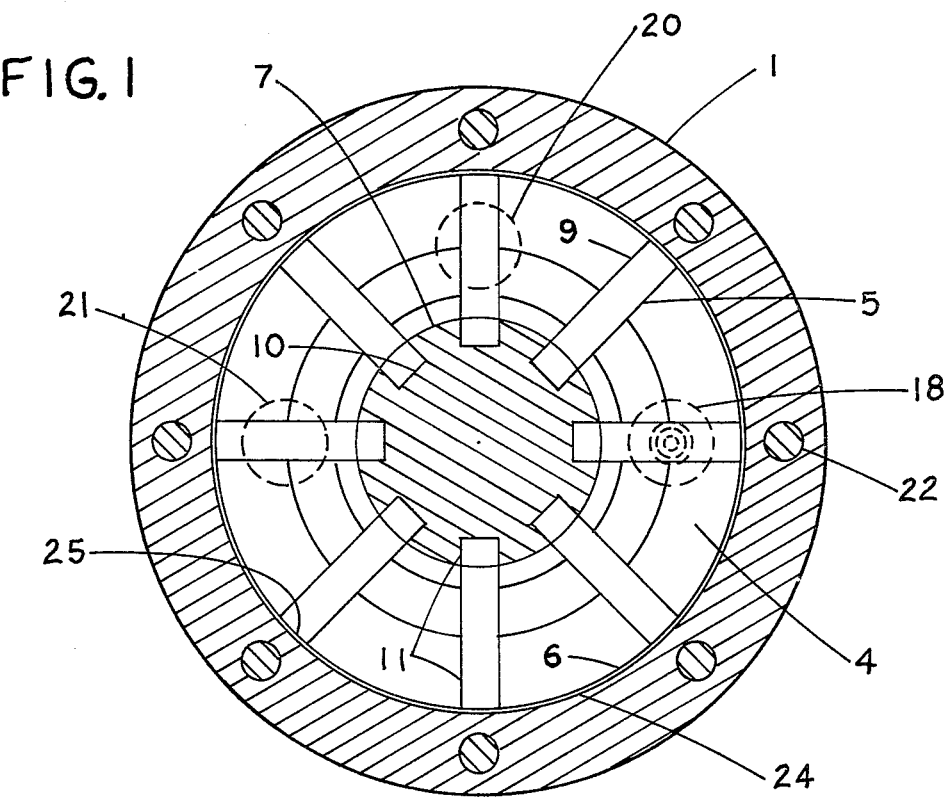
FIG. 1 is a cross sectional view taken at the interface of the housing left hand cover plate with the housing looking toward the housing right hand cover plate.
Figure 2:
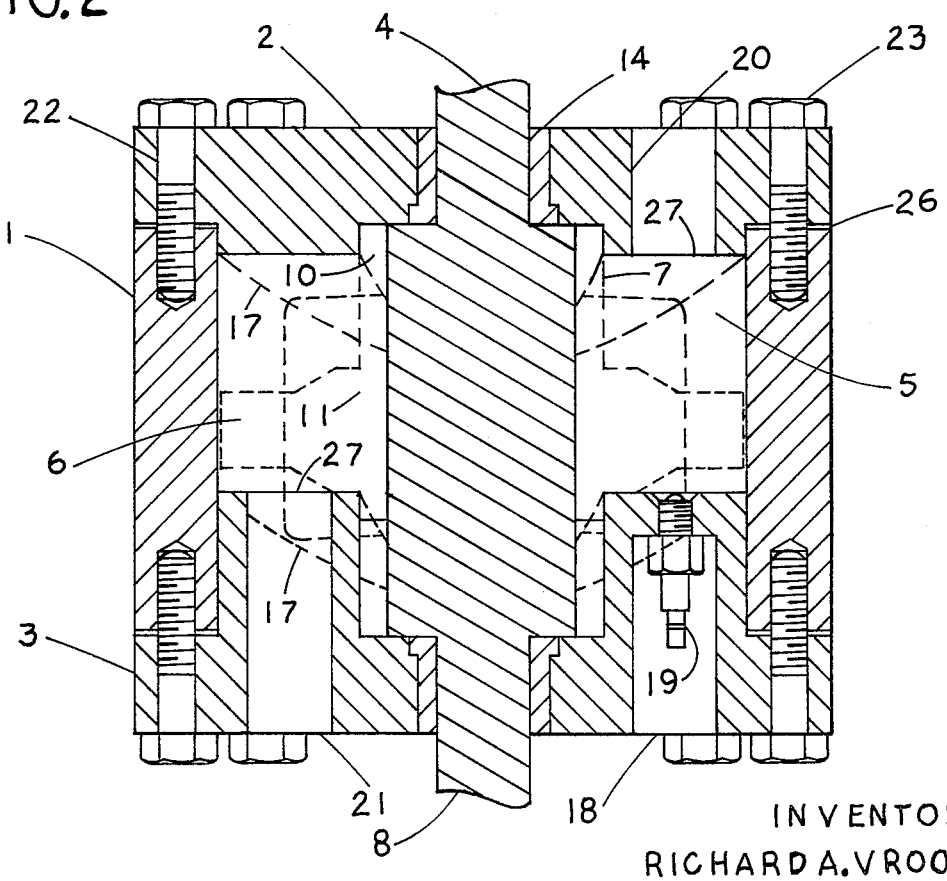
FIG. 2 is a crossectional view through the engine centerline looking toward the right hand side.
Figure 4:
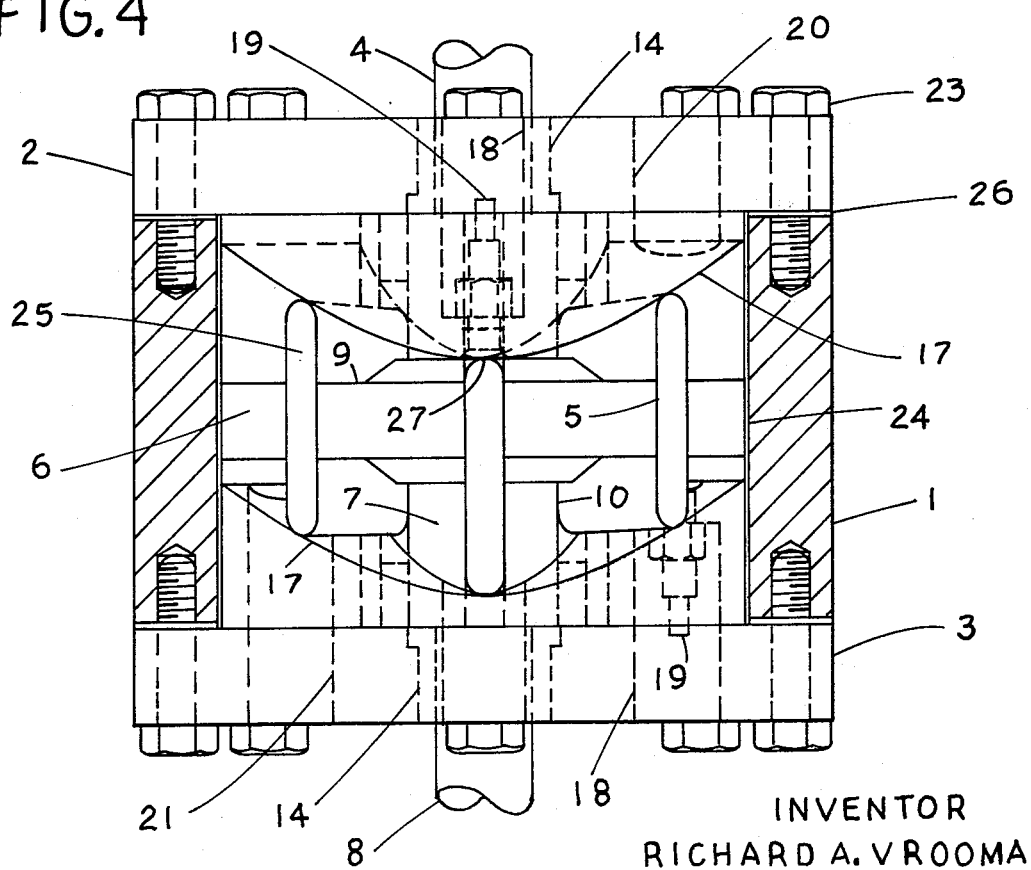
FIG. 4 is a cut-a-way section of the housing to expose the inner engine mechanism. View is taken looking toward the right hand side through the centerline.
Figure 6:
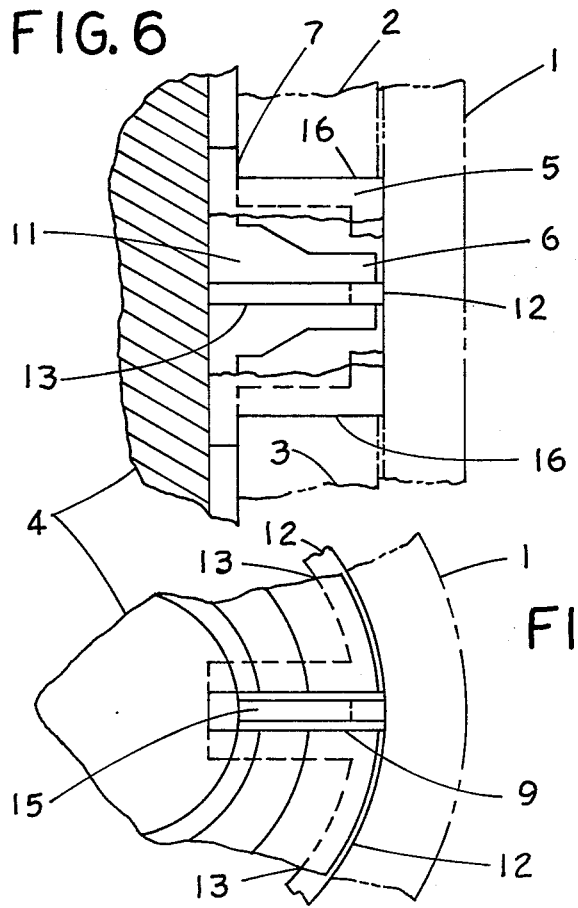
FIG. 6 is a partial section through the rotor disk gas seal slot and gas seal barrier to illustrate a means of sealing the sliding interface with the rotor disk and contoured cam surface for high compression Otto and Diesel thermodynamic cycles.
Figure 7:
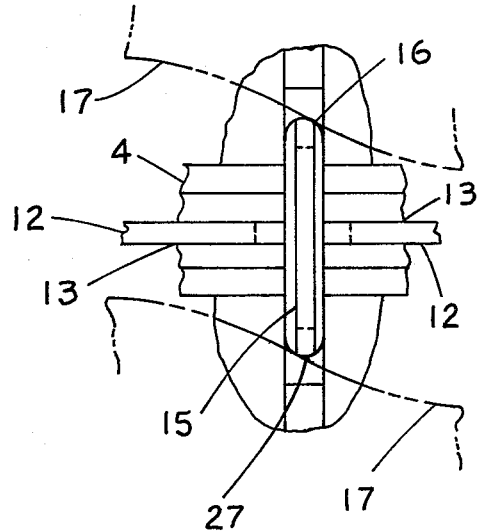
FIG. 7 is a top view of FIG. 6.
Figure 8:
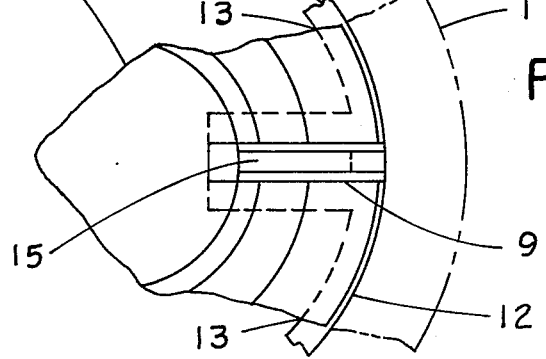
FIG. 8 is an end view of FIG. 6.

Referring to the drawings in detail, 1 is the circular housing; 2 is the housing left hand cover plate; 3 is the housing right hand cover plate; 4 is the rotor assembly; and 5 is one gas seal barrier of eight identical items illustrated in all the figures. Referring to FIGS. 1, 2, and 4; the rotor assembly 4 is a circular disk 6, smaller diameter hub 7, and power output shaft 8 machined into one integral unit. Slots 9 arranged radially about the disk diameter are in line with corresponding slots 10 in the hub surface, contain the free floating gas seal barrier 5. The surface area 11 in contact with the gas seal barriers 5 forms a track that limits the motion parallel to the rotor assembly centerline. These surfaces 11 receive the forces transmitted through the gas seal barriers, functioning as paddles, from the expanding ignited combustable mixture inducing rotor torque. Due to the necessary clearances between the housing 1 and the rotor disk 6, the gas seal barriers 5 and the rotor disk gas seal slots 9, gas leakage is possible for high compression Otto and Diesel Thermodynamic cycles. To provide gas seals, gas sealing strips 12 are installed in appropriate slots 13 machined into the rotor disk 6 between gas seal barrier slots 9 as illustrated in FIGS. 6, 7, and 8. The metal sealing strips are spring loaded and easily replaced when necessary. The output shaft 8 is illustrated machined integral with the hub 7. Final design may require a separate unit or other suitable mechanical fabrication. The entire rotor assembly 4 is provided low friction support by the housing end plate bearings 14, FIG. 2. These bearings are illustrated as bushings, but roller or ball bearings are technical alternatives. The power output shaft 8 is joined to a suitable clutch, coupling or transmission for power distribution.

The gas seal barriers 5, as shown in FIGS. 1, 2, 4, and 6; are essentially a smooth edge flat plate machined to interface with the rotor disk slots 9 and the circular housing 1. Their function is to form the wall or barrier between any two of which is contained the combustable mixture. Because of the rubbing friction on each side and edge, appropriate heat treating will be required. For extreme high compression Otto or Diesel cycle engines, additional edge gas sealing strips 15 as shown in FIGS. 6, 7, and 8 are provided. The gas seal barriers 5 are fabricated with slots 16 in which spring loaded sealing strips 15 are inserted. The gas seal barriers free float in the rotor slots 9 and as the engine increases RPM, the gas seal barriers displace radially outward and press against the inner surface of the circular housing 1 preventing gas leakage. Past experience with other rotary engines and the gas turbine has shown that gas leakage is toward the low pressure exhaust port and will not back-flow into the fresh incoming combustable mixture. Consequently, for a mass produced engine, the compression ratio can be optimized to eliminate the need for the complex gas seals. The gas seal barrier 5 is shaped to extend beyond the contoured cam surface edge 17, FIG. 2, to prevent gas leakage along the rotor hub 7. The gas seal barriers also function as paddles or as flat impulse turbine buckets to receive the gas pressure and induce a torque through the rotor disk 6 and output shaft 8.

Figure 3:
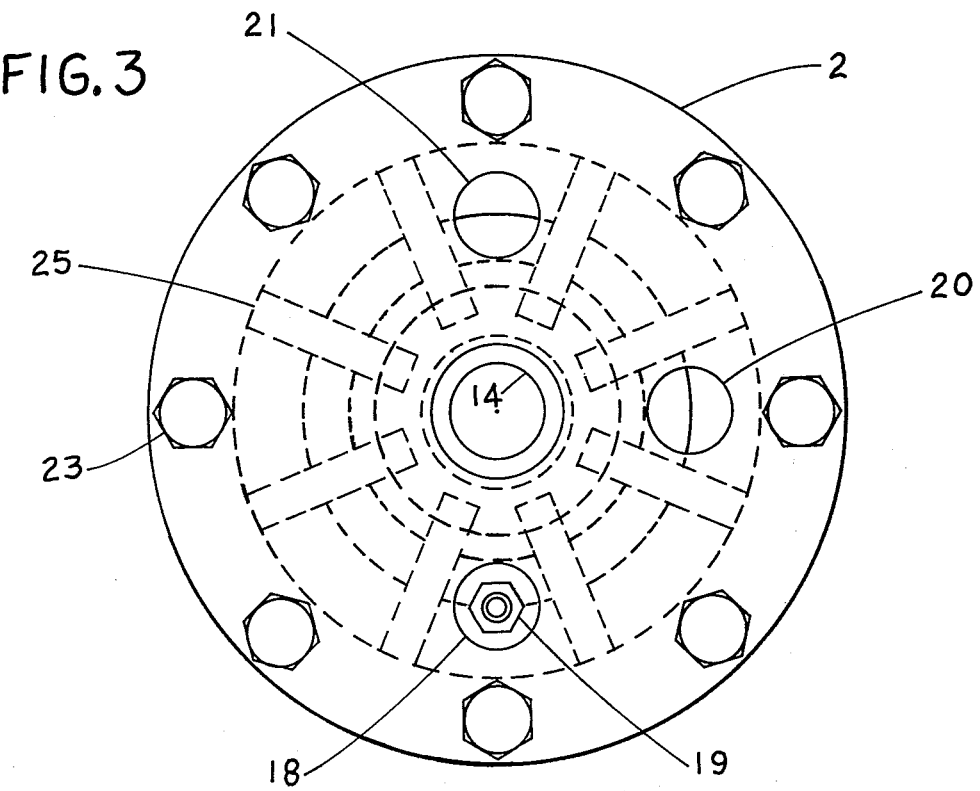
FIG. 3 is an end view of the housing left hand cover plate.

The housing left hand cover plate 2 is rotated 90° clockwise with respect to the position of the right hand cover plate 3, but otherwise they are symmetrical and identical in construction. The housing cover plates are shown in FIGS. 2, 3, and 4. Each cover plate contains the housing end plate bearing 14, the ignition plug 19, the intake port 20, the exhaust port 21, the housing attach bolt holes 22, and the housing bolts 23. Fabrication may be by machining, casting, or forging. The contoured cam profile 17 is shown integral with the cover and is machined to tolerances compatible with the gas seal barriers fit limits and thermal expansion during engine operation. A maximum displacement of the left hand cover plate cam corresponds with a minimum displacement of the right hand cover plate cam. Due to high rubbing pressures, these surfaces shall be hardened. Wear is to be expected, consequently, an alternate design would feature a separate contoured cam profile plate to facilitate replacing worn cams and provide a greater latitude in utilizing different cam profiles for special engine operating conditions. The gas seal barriers 5 function as cam followers during engine operation and will reciprocate parallel to the rotor assembly 4 centerline rotational axis. The contoured cam profile face 17 forms a wall of the combustion chamber formed between any two gas seal barriers 5 with the rotor disk face 6 the fourth wall and the rotor hub 7 the combustion chamber floor. The ignition plug well 18 is located 90° from the intake port 20 and contains the ignition plug 19. The ignition plug tip protrudes through the contoured cam profile surface 17 and provides ignition energy to the combustable mixture at maximum compression. Further development of the engine may dictate a slight lead or lag of plug position or the necessity for multiple plugs at each position to insure complete combustion. The ignition plug 19 can be either a glow or a spark plug, but due to the close proximity of the combustion chambers, the glow plug seems more feasible. If the glow plug is utilized, a fuel or air cut-off will be necessary to terminate engine operation. FIG. 3 illustrates the relative position of the intake port 20 at 0°, the ignition plug well 18 at 90°, and the exhaust port 21 at 180°. Detail design may require minor changes in these positions to satisfy thermodynamic requirements. FIG. 4 illustrates the assembly of the left and right hand cover plates to the circular housing 1. The rotor assembly with the gas seal barriers is mounted in the cover plates on the bearings 14 with the gas seal barriers rubbing against the contoured cam profile 17. The housing attach bolt holes 22, FIG. 1, contain the housing bolts 23 which mate with the circular housing 1 as shown in FIGS. 2, 3, and 4.

The circular housing 1 is cast, machined, or forged and is illustrated in FIGS. 2, 3, and 4 as a simple tube. The housing inner surface 24 is hardened for optimum wear and a clearance is maintained between the rotor disk 6, FIG. 1, for thermal expansion. At operating RPM, the free floating gas seal barriers 5 will displace radially outward and press against the housing inner surface 24 forming an effective gas seal. Consequently, the mating gas seal barrier edge 25, FIGS. 1 and 6 is radiused to fit the inner housing surface 24. For liquid cooling, the circular housing 1, will be cast with a double wall to permit cooling fluid circulation to draw off the surplus heat from the combustion process. Gaskets between the mating left and right hand cover plates and the circular housing will be necessary for liquid cooling. The air cooled version will only require a minimum fabric gasket 26 for mating compatibility.

Engine operation may be explained with reference to FIG. 5 which is a schematic, flat development to illustrate the relationship of the circular engine components in a flat plane. The contoured cam profile 17 contains the gas seal barriers 5 as cam followers. The rotor disk 4 provides mechanical separation and limits the gas seal barrier motion parallel to each other. The left hand cover plate 2 is shown from the ignition plug well 18 to the exhaust port 21, 180° apart. The right hand cover plate 3 is shown from the intake port 20 to the ignition plug well 18, 90° apart, and ends approximately 90° from the ignition plug well. The rotor disk stays fixed in position relative to the cover plates and is free to move from left to right as shown by the arrow, inducing a contact between the gas seal barrier edges 27 interfacing with the right hand cover plate contoured cam profile 17. As rotor motion continues to the right, the gas seal barrier is forced to slide through the rotor gas seal slots 9. Since each adjacent pair of gas seal barriers experience the displacement, the length protruding through the rotor right face decreases and the corresponding length protruding through the rotor left face increases. Consequently, the volume contained between the right hand cover plate contoured cam, the adjacent gas seal barriers, and the rotor right hand face decreases while the volume contained between the left hand cover plate contoured cam, the adjacent gas seal barriers, and the rotor left hand face increases. Thus a variable volume combustion chamber is formed on each rotor disk face. Engine operation begins when the combustable mixture is drawn into the right hand cover plate intake port 20. The volume in the combustion chamber inline with the intake port is a maxumum and since the chamber had just passed an exhaust port, pressure is below the intake manifold pressure inducing an inward flow of the combustable mixture. The rotor assembly 4 continues in motion to the right causing the gas seal barriers 5 to engage the right hand cover plate contoured cam profile 17. The increasing cam displacement forces the gas seal barriers 5, enclosing the combustable mixture, to displace and slide through the rotor gas seal slot 9, decreasing combustion chamber volume and increasing the pressure. After a 90° rotation, the cam displacement maximizes and the combustion chamber volume is momentarily fixed at a minimum volume directly opposite the ignition plug 19. Otto or Diesel cycle constant volume heat addition is approximated at this rotor position. As the rotor continues in motion to the right, the cam profile displacement decreases increasing the combustion chamber volume and expanding the trapped gasses. As the gasses expand, the combustion chamber pressure decreases inducing a pressure drop across the gas seal barrier 5 leading the rotation direction. The pressure drop induces a force to push against the gas seal barrier. This force is transmitted to the rotor through the contact surfaces 11 producing output torque through the power output shaft 8. Total force on the gas seal barrier 5 is equal to the pressure drop force plus the static pressure force of the ignited gasses. The gasses are expanded for 90° rotation from the ignition plug for the power producing portion of the cycle.

Figure 5:
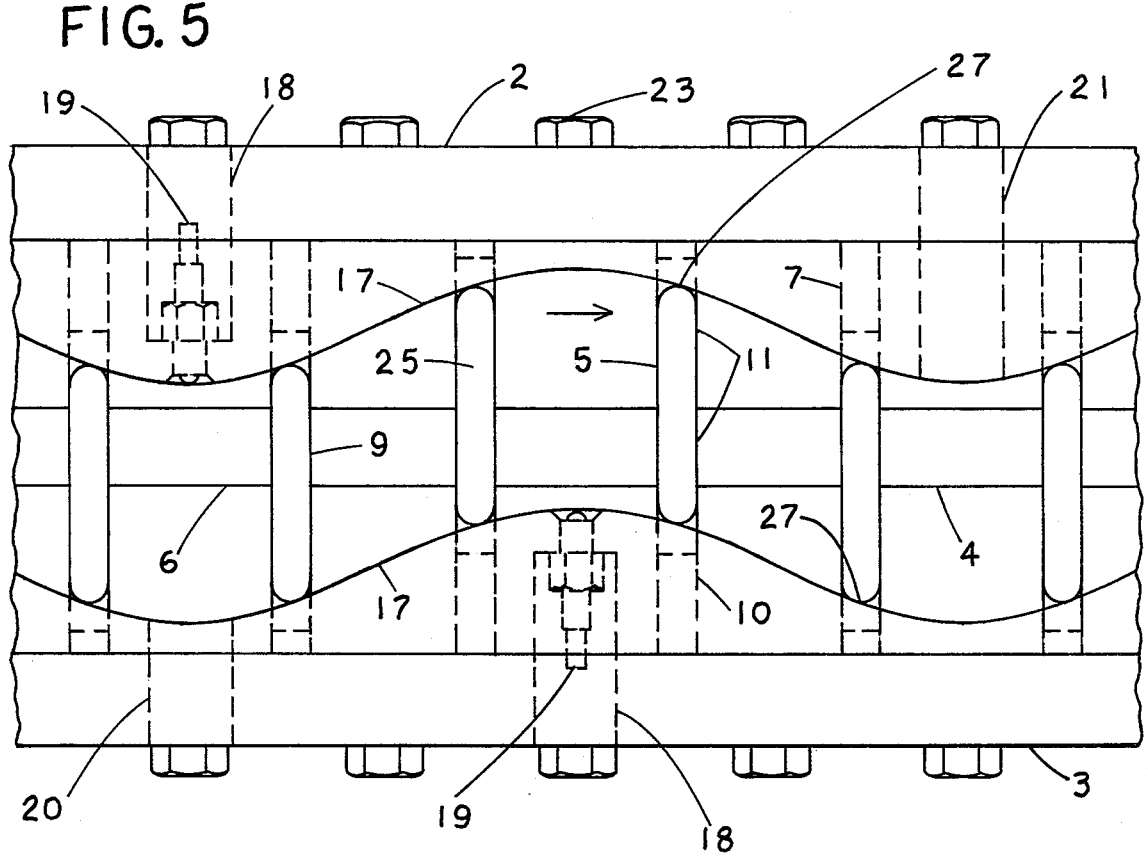
FIG. 5 is a schematic flat development of the circular contoured cam to be used to explain engine operation.

For the exhaust portion of the cycle; refer to the left hand cover plate 2, FIG. 5. The left hand cover plate ignition plug 19 is directly across from the right hand cover plate intake port 20. This plug position is 90° counter-clockwise to the left of the right hand cover plate ignition plug position. Thus two engines, 90° out of phase with identical thermodynamic processes, are contained on each rotor disk face. The ignited gasses expand to a maximum combustion chamber volume during the power producing portion of the cycle and at that point, the left hand cover plate contoured cam profile 17 increases its displacement with resulting decreasing combustion chamber volume. The spent gasses are forced out of the minimum volume combustion chamber and into the exhaust port 21 located 180° from the ignition plug. As the rotor continues in motion to the right, the contoured cam profile decreases its displacement increasing combustion chamber volume. The combustion chamber volume reaches a maximum 90° to the right of the exhaust port 21 and inline with the intake port 20 to start a new cycle. The Diesel cycle engine operation would be identical except fuel injectors would be required at the intake port and the ignition plug would only be used for starting. For the engine illustrated in the drawings, a single Otto or Diesel cycle thermodynamic process per rotor revolution takes place between any pair of gas seal barriers on each rotor face and the number of combustion chambers would vary according to the engine horsepower. For larger diameter engines, it would be possible to accommodate multiple thermodynamic processes per revolution by appropriate contouring of the cam profile. The required number of gas seal barriers would always equal one-half the required number of combustion chambers. Low horsepower engines would have small diameter rotors and 6 to 16 combustion chambers with the width of the gas seal barriers 0.35 to 0.45 rotor diameter. Medium horsepower engines would have 16 to 28 combustion chambers, high horsepower engines 28 to 50 or more. In each case, the number of combustion chambers is determined by the nominal volume of combustable mixture the ignition plug can efficiently ignite and the inherent horsepower per unit volume engine displacement the mechanism described above would permit.

The multi-chambered internal combustion rotary engine illustrated in the included drawings and described in the above text is to be considered illustrative of the invention concept. In the course of design and construction, variations from that which is specified above may occur and it is understood that no limitations be placed on these variations falling within the scope of this invention as claimed.

What is claimed is:

1. In a rotary internal combustion engine, a circular housing enclosing a circular disk rotor coincident and symetrical about the same centerline, multiple radially oriented slots machined in the rotor disk in which is fitted multiple gas seal barriers constrained in displacement means parallel to said rotor disk center-line axis thus joined with the rotor to form a single assembly, said gas seal barriers trapped between two contoured cam surfaces means functioning as force transmitters for inducing motion to said rotor disk, left and right hand cover plates enclosing upon and supporting by bearing means said rotor assembly forming an integral structure by attaching bolt means with the circular housing enclosing said rotor disk and multiple gas seal barriers, said left and right hand cover plates contain integrally contoured cam surfaces displacement means with left hand cover plate maximum displacement means coincident to right hand cover plate minimum displacement means, combustable mixture ignition means located at or near maximum compression position contoured cam displacement means; combustable mixture intake means through each cover plate into combustion chamber formed by any two adjacent gas seal barriers, the contoured cam surface, the rotor disk face, and the rotor hub surface; combustable mixture compressing or expanding means as contoured cam profile increases or decreases displacement means, exhaust means through cover plates expelling spent combustable mixture from said combustion chamber, power output means through shaft attaching means to rotor disk hub.

2. The combination described in claim 1 with the addition of gas seal barrier gas sealing means with sealing strips fitted to each edge in contact with the contoured cam surfaces, rotor disk periphery and gas seal slot gas sealing means with sealing strips fitted between each gas seal barrier position.

3. The combination described in claim 1 with a seperate contoured cam profile means attached by suitable fastener means to each cover plate.

4. The combination described in claim 2 with a seperate contoured cam profile means attached by suitable fastener means to each cover plate.

* * * * *